S. Scholfield.

Life Preserver.

No. 1,503. Reissued Jun. 23, 1863.

Witnesses;
Stephen Allen
M. Scholfield

Inventor;
Socrates Scholfield

UNITED STATES PATENT OFFICE.

SOCRATES SCHOLFIELD, OF NORWICH, CONNECTICUT.

APPARATUS FOR TEACHING THE ART OF SWIMMING.

Specification forming part of Letters Patent No. 38,505, dated May 12, 1863; Reissue No. 1,503, dated June 23, 1863.

*To all whom it may concern:*

Be it known that I, SOCRATES SCHOLFIELD, of Norwich, in the county of New London and State of Connecticut, have invented a new and Improved Apparatus for Teaching the Art of Swimming; and I do hereby declare that the following is a full and exact description, reference being had to the accompanying drawing, making a part of this specification.

The nature of my invention consists in so constructing an apparatus consisting of a float, together with a suitable arrangement for breathing, that while it may act beneficially when the wearer is motionless in the water it may also be rendered superfluous and inoperative while he is making the proper motions in the act of swimming. This change from a state of beneficial action to a state in which such action is suspended, being effected by such motions and directly resulting therefrom.

In order to enable those skilled in the art to make and use my invention, I will proceed to describe its construction and operation.

Figure 1:
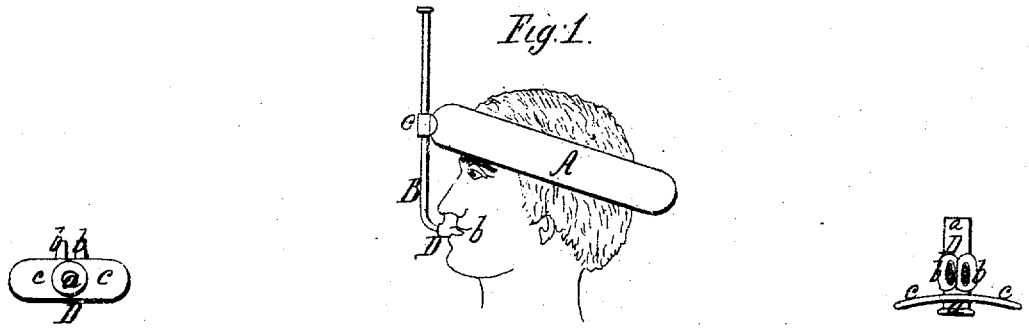
Figure 2:
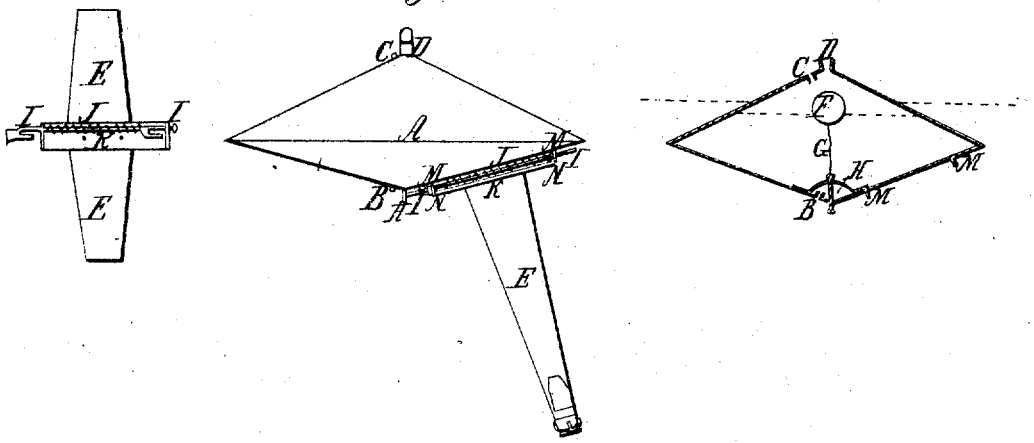

A in Figure 1 represents a float in the form of a ring to be secured to the head in the position represented. The breathing-pipe B passes from the mouth upward through the ring C, which is secured to the float. To the curved end of the pipe B is attached the mouth-piece D, of india-rubber or other suitable material, consisting of the two small pipes *b b'* joined to the main pipe *a*, which is furnished with a flange, *c c*, to secure the same to the mouth properly. This mouth-piece, when adjusted, furnishes a communication with both the mouth and nostrils for the purpose of breathing, the air being received and expelled through the pipe B.

The manner of using the apparatus will be as follows, viz: After placing the float upon upon the head, as represented, the pipe B is to be passed up through the ring C, and the mouth-piece D adjusted by securing the pipes *b b'* to the nostrils in such a manner as to exclude the water while breathing, and the pipe *a* to the mouth by clasping the flange *c c* with the lips, securing the whole firmly. In breathing, the air will pass from the nostrils through the pipes *b b'*, and from the mouth through the pipe *a*, connecting with the pipe B.

It is now evident that a person so prepared can never sink in the water far enough to obstruct the pipe B, through which he breathes. He should therefore enter the water until he is supported by the float, when by making the least exertion his head, with the whole apparatus attached, will be raised out of the water, thereby compelling the conviction that in future he can rely upon his own unaided exertions for support.

It is not essential that the float used should be made in the form proposed, or be attached in the position described, as it may be made of any proper shape to be secured in any position where the motion of the wearer in the act of swimming will cause it to be raised out of the water in such a manner as to render it inoperative.

The breathing apparatus may also be modified so that the pipe B may connect only with the nostrils through the pipes *b b'*, the pipe *a*, with its flange *c c*, being omitted. With this arrangement the mouth must be kept closed while under the water, and the breathing carried on through the nose.

What I claim as my invention, and desire to secure by Letters Patent, is—

1. The combination of a float with a suitable apparatus to prevent the entrance of water while breathing, the whole being constructed to operate substantially in the manner described.

2. A mouth-piece, D, arranged with the pipes *a* and *b b'*, to be applied directly to the mouth and nostrils, substantially as specified.

SOCRATES SCHOLFIELD.

Witnesses:

CYRUS N. SCHOLFIELD,

B. F. SCHOLFIELD.